Patented Sept. 11, 1934

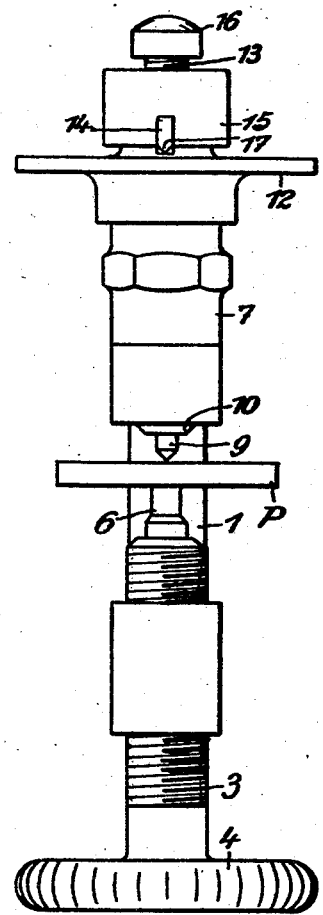
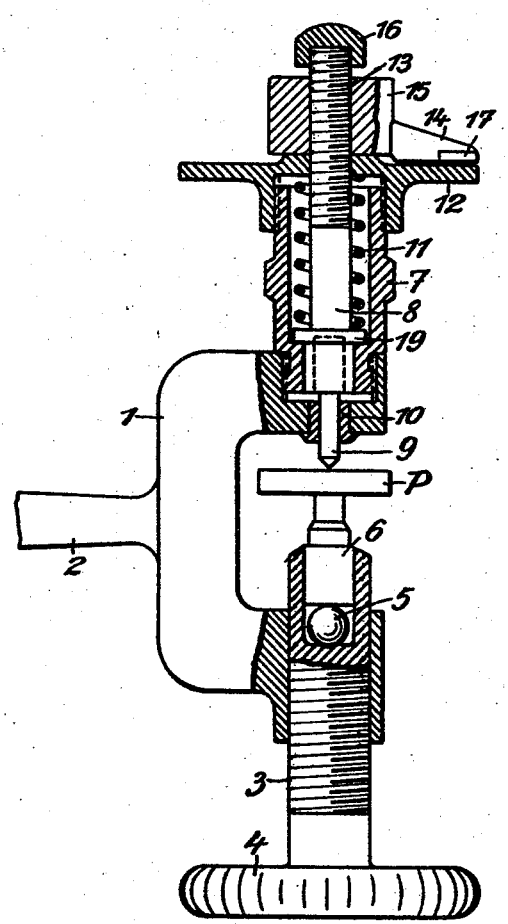
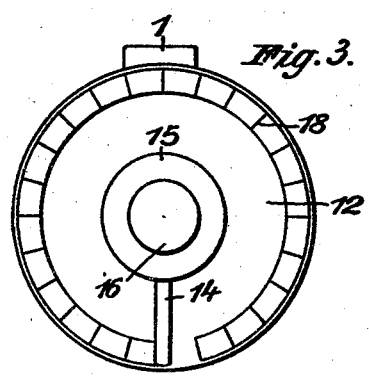

1,973,333

UNITED STATES PATENT OFFICE 1,973,333

HARDNESS TESTER

Paul Craemer, Herzebrock, Germany

Application April 6, 1933, Serial No. 664,826
In Germany March 30, 1932

1 Claim. (Cl. 265—19)

The invention relates to a hardness tester which enables the hardness of work materials to be directly read off quickly and with sufficient accuracy for any particular work in hand. The new hardness tester is suitable, for example, as a control instrument in commercial firms for iron, steel, sheet metal and the like, and in engineering work-shops, and is also particularly suitable for pressing and stamping works which operate on waste sheet metal of various kinds which must be tested from time to time by a substantially accurate hardness test as to its suitability for any work that may be required to be performed.

The new hardness testing device depends on the principle of the so-called ball pressure system, i. e. it measures the impression produced in the work material by a pressure member under the test load, said impression varying according to the degree of hardness. In the measurement of hardness the test piece is always moved through the same path against the pressure member which has a limited longitudinal movement and which stands under the action of a load spring so that the spring is practically always tensioned to the same testing load. The impression thus produced by the pressure member in the work material—which impression varies according to the hardness of the latter—is measured in a suitable manner and when converted into hardness values may be directly read off on a scale with sufficient accuracy for working requirements.

Owing to the varying depth impressions of the pressure member in the work material depending on the hardness of the latter, the spring experiences a slight relief of tension so that the test load automatically set by the bearing of the test piece on the pressure member is always somewhat smaller than the test load due to a completely tensioned spring as would occur with infinitely hard work materials although these deviations from the theoretical maximum spring pressure are so small that they may be disregarded for the approximately correct hardness determination aimed at by the invention. Regard is therefore only paid to the linear differences of the load spring stroke due to the changing degrees of hardness, said differences being proportional to the differences in the hardness of the work material and being directly measured with suitable measuring tools in order to obtain the harness value, as for example, with the aid of the micrometer screw.

A constructional form of hardness tester according to the invention is illustrated in the accompanying drawing in which:

Fig. 1 is a front elevation,
Fig. 2 is a side elevation partly in section,
Fig. 3 is a plan view of a reading disc.

The hardness tester illustrated in the drawing has a strong frame member 1 of general C-shape provided with a handle 2. An adjusting screw 3 rotatable by means of a milled knob 4 is supported in one limb of the member 1. The other end of the screw 3 extends into the space between the two limbs of the member 1 and carries a test piece support 6 which rests on a ball 5 or the like. A test piece P may be mounted on the support 6.

A sleeve 7 is secured in the other limb of the member 1 co-axially with the screw 3. A reciprocatory rod 8 is supported within sleeve 7 and is provided at its end adjacent the screw 3 with a pressure member 9 comprising, for example, a hardened steel pin having a conical or spherical shaped end. The pressure member 9 is guided by a sleeve 10 consisting, for example, of hardened steel the end faces of which are accurately perpendicular to the common axis of the parts 3 and 8. The rod is placed under the action of a load spring 11, for example, a helical spring which is placed in the sleeve 7 with a preliminary tension and which bears at one end against a collar 19 on the rod 8. The other end of the spring bears against an upper closure cap 12 which is screwed with a tight fit on the sleeve 7 and which may be used for accurately regulating the tension of the spring. The spring 11 tends to move the rod 8 towards the screw 3, such movement being limited by the collar 19 bearing on a shoulder formed in the interior of the sleeve 7. When, on the other hand, the rod is so far moved towards the closure cap 12 that the point of the pressure member 9 is disposed in the plane of the lower surface of the guide sleeve 10, the spring is strained to the maximum test load.

The upper end of the rod 8 is provided with a fine screw thread 13 on which is screwed a sleeve 15 provided with a pointer 14. A cap 16 is applied to the end of the spindle so that the sleeve 15 can be screwed up and down between said cap and the upper surface of the cap 12 is formed as a disc. The pointer 14 is provided with a sharp edge 17 and moves over a hardness indicator scale 18 (Fig. 3).

In assembling the new hardness measurer a test piece having a degree of hardness accurately determined in the laboratory is utilized for correctly adjusting the reading scale 18. This test piece is pushed between the pressure member 9 and the support 6 in order to compress the spring 11 and then the cap 12 is turned on the sleeve 7 and the sleeve 15 is screwed down on the screw thread 13 until the pointer edge 17 registers accurately with that division of the scale 18 on the upper surface of the cap disc 12 corresponding to the hardness of the work material measured in the laboratory. According as work materials subsequently measured with the instrument possess a greater or smaller hardness value so does the pointer edge move to the right or left of this division on the scale until it is temporarily prevented from further rotation in a position corresponding to the degree of hardness of the material under test. Thus by employing standard test pieces of accurately determined or known hardness, and appropriately adjusting the pointer sleeve 15 with respect to the appropriately calibrated hardness scale 18 having thereon indications of corresponding hardness values, the hardness of any desired material may be determined by pushing it between the pressure member 9 and support 6 and moving it axially by means of the screw 3 until it bears against the lower face of sleeve 10, whereupon the sleeve 15 is turned towards the scale 18 until by binding on part 12, it is prevented from further rotation; in this position the pointer edge coincides with a definite division of the scale and thus without further difficulty the ascertained degree of hardness can be read off numerically with an accuracy completely sufficient for any working requirement.

After the reading has been taken and the material under test has been removed, it is necessary for the sleeve 15 to be screwed back sufficiently far towards the stop 16 to enable the tension of the spring to be slackened and to permit the return of the pressure member. With a suitably selected pitch for the screw thread 13 sufficiently large angular movements of the pointer edge over the scale corresponding to the differences of the impressions in the work under test are obtained without the employment of special means for magnifying the depths of the impressions to enable them to be measured and read. It is, of course, within the scope of the invention to provide other means than those hereinbefore described and illustrated in the drawing for enabling the variations in the compression of the spring corresponding to the different degres of hardness to be directly read.

What I claim is:—

A hardness tester comprising a yoke-shaped frame, specimen-supporting means and a penetrating member and cooperating spindle disposed interiorly of the span of said yoke and movably mounted in the arms of said yoke, a sleeve disposed in that arm carrying the spindle, a closure cap having a scale thereon disposed around said spindle and threading on said sleeve, a permanently tensioned spring disposed about said spindle and abutting against the inner surface of said closure cap and tending to force the penetrating member inwardly, a cap disposed about the outer end of said spindle, and an indicator threaded on said spindle and disposed between said closure cap and said last-mentioned cap so as to be capable of limited rotation about said scale upon outward movement of said spindle against the tension of said spring to indicate the hardness of said test specimen.

PAUL CRAEMER.